UNITED STATES PATENT OFFICE.

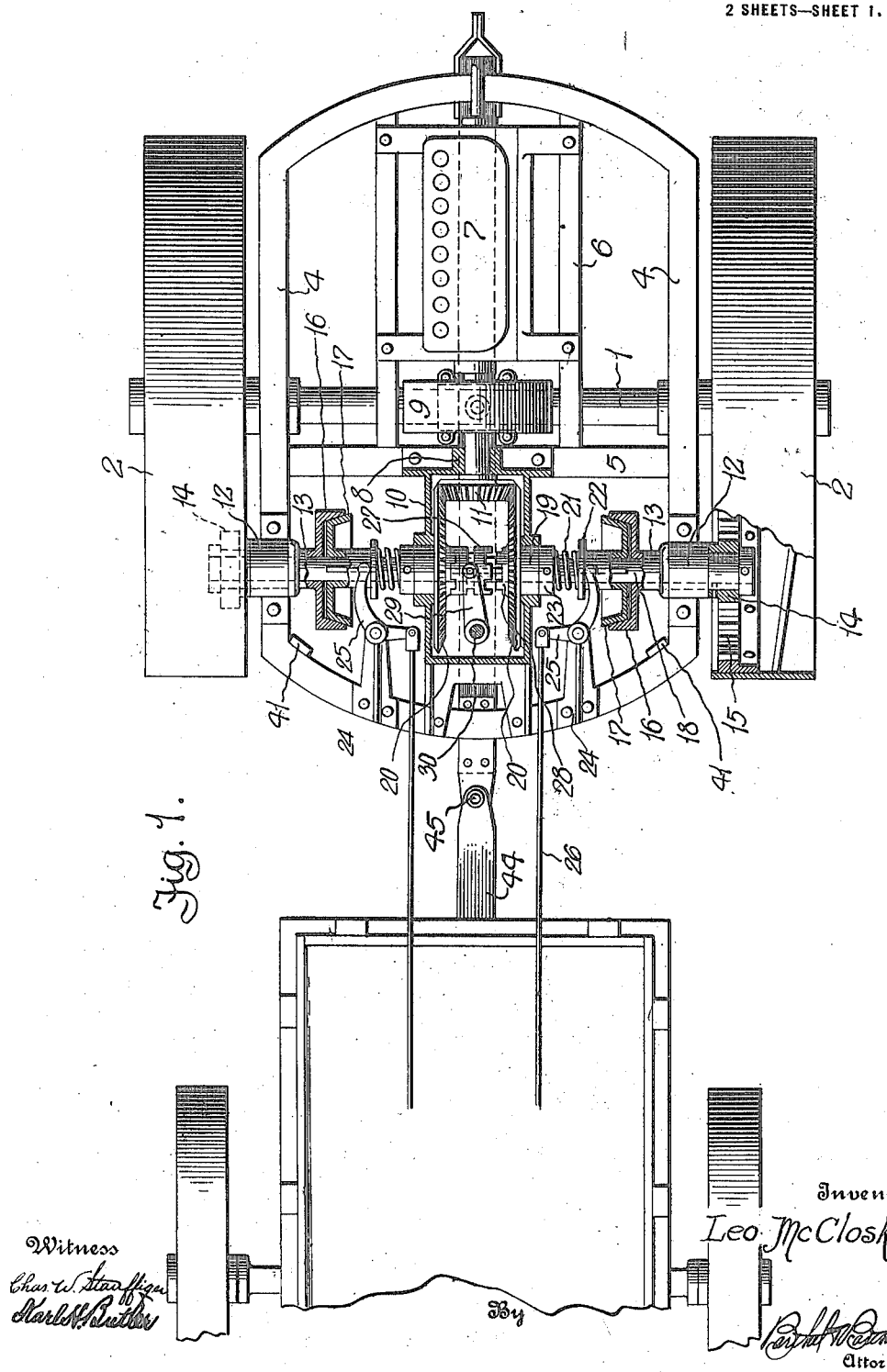

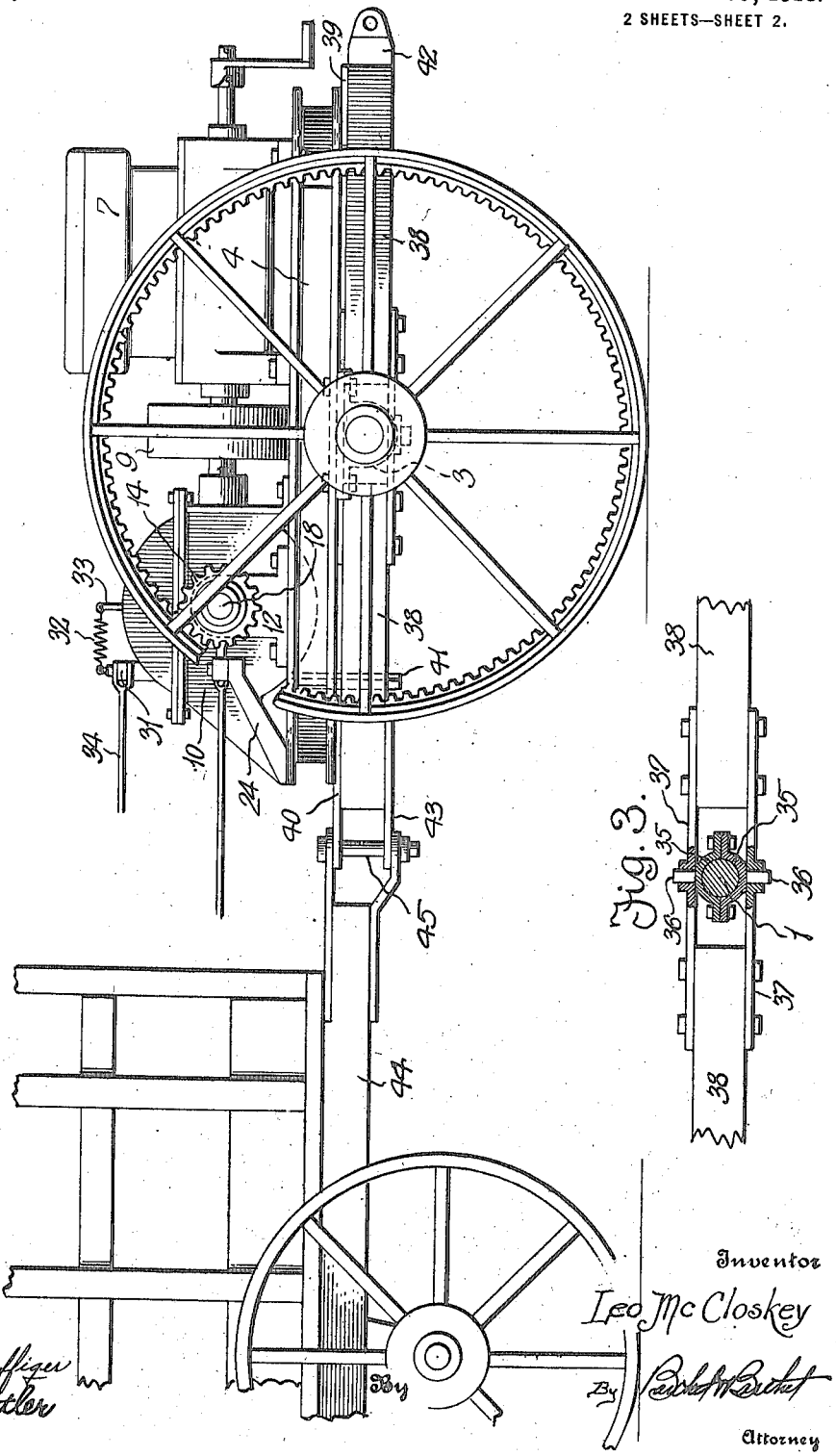

LEO McCLOSKEY, OF MAIDSTONE, ONTARIO, CANADA.

TRACTOR.

1,270,480.  Specification of Letters Patent.  Patented June 25, 1918.

Application filed August 17, 1917. Serial No. 186,681.

*To all whom it may concern:*

Be it known that I, LEO MCCLOSKEY, a subject of the King of Great Britain, residing at Maidstone, county of Essex, Province of Ontario, Canada, have invented certain new and useful Improvements in Tractors, of which the following is a specification, reference being had therein to the accompanying drawings.

This invention relates to tractors, and has special reference to that type of tractor characterized by two traction wheels and a frame balanced relative to said wheels and attachable to the load to be moved, so that the frame of the tractor will be held in operative relation to the load.

My invention aims to provide a tractor of the above type that may be readily controlled from the load or a point remote to the tractor proper, such control being very similar to that of guiding a horse by reins, that is, there are two control rods or reins which when pulled upon will cause a cessation in the operation of the tractor, or when either is pulled the tractor can be steered in one direction or the other.

My invention further aims to provide a tractor of the above type embodying a power plant and drive shafts for imparting movement to the traction wheels, the drive shafts forming part of a simple, effective and compact transmission mechanism. Associated with the transmission mechanism is a differential mechanism having a novel clutch by which the forward or backward movement of the tractor is determined, and the operating mechanism of this clutch is in proximity to the other control mechanism of the tractor, so that the tractor can be completely controlled from a remote point.

My invention still further aims to provide a tractor with a novel draw bar connected directly to the axle of the tractor, the connection being such that the tractor frame may shift relative to the draw bar, somewhat similar to a fifth wheel, thus permitting the tractor, through the medium of its two traction wheels, to turn in a comparatively small space.

My invention still further aims to provide a two wheeled tractor wherein the parts are constructed with a view of reducing the cost of manufacture and still retain those features by which safety, durability, accessibility and ease of assembling are secured.

With such ends in view, my invention further resides in the novel construction to be hereinafter considered and then claimed.

Reference will now be had to the drawings, wherein—

Figure 1 is a plan of the tractor, partly broken away and partly in section, showing the same relative to a trailer or load to be moved;

Fig. 2 is a side elevation of the same; and

Fig. 3 is a side elevation of a portion of the draw bar showing its connection with the axle in section.

In the drawings, the reference numeral 1 denotes an axle having the ends thereof provided with large traction wheels 2, and said axle extends through bearings 3 carried by a tractor frame, generally denoted 4. The tractor frame 4 has a transverse member 5 and longitudinal member 6, the latter supporting a power plant 7. The power plant is preferably in the form of an internal combustion engine, and includes such essential appurtenances as a source of fuel, ignition and cooling systems and a starting device. The engine shaft 8 has the usual fly wheel 9 and said engine shaft extends into a gear casing 10 secured on the member 5 and one end of the frame 4, said engine shaft having a beveled gear wheel 11 within the gear casing.

Mounted on the sides of the frame 4 are bearings 12 for clutch sleeves 13 and the outer ends of said clutch sleeves have fixed pinions 14 meshing with circular racks or external gears 15 carried by the inner sides of the traction wheel rim.

The inner end of the clutch sleeves 13 have clutch members 16 adapted to be engaged by shiftable clutch members 17 slidably keyed on drive shaft 18 extending through the clutch sleeves 13 and through the hubs 19 of beveled gear wheels 20 within the gear casing 10. The hubs 19 are journaled in the side walls of the gear casing and the beveled gear wheels 20 constantly mesh with the beveled gear wheel 11 so as to be driven thereby.

The clutch members 17 rotate with the drive shaft 18 and are adapted to be held in engagement with the clutch members 16 by the expansive force of coiled springs 21 encircling the drive shaft 18, between flanged hubs 22 of the clutch members 17 and collars 23 at the gear wheel hubs 19.

Mounted on what may be considered the rear end of the frame 4 are brackets 24 supporting pivoted bell cranks 25. Curved arms of said bell cranks engage the flanged hubs 22 of the clutch members 17 and controlling rods or reins are connected to the short or straight arms of said bell cranks so that said bell cranks may be manually moved on their pivots to shift the clutch members 17 out of engagement with the clutch members 16, the purpose of which will hereinafter appear.

Slidably keyed on the drive shaft 18, between the beveled gear wheels 20 and rotatable with the drive shaft is a double clutch member 27 adapted for engagement with the clutch faces or members 28 of the beveled gear wheels 20. Extending into a peripheral groove of the double clutch member 27 is the end or anti-frictional bearing of the crank 29 on a vertical rock shaft 30 journaled in suitable bearings carried by the gear casing 10. The upper end of the shaft 30 has another crank 31 connected by a coiled retractile spring 32 to a post 33 on the gear casing, the retractile force of said spring holding the double clutch member 27 in engagement with one of the beveled gear wheels 20, so that this part of the control mechanism will be normally in position for forward movement of the tractor. A control rod or rein 34 is connected to the crank 31 said rod extending in the same direction as the rods 26 in order that all of said rods may be manipulated at a point remote to the tractor.

Clamped on the stationary axle 1, intermediate the ends thereof, is a trunnion member 35 having vertically disposed trunnions 36 extending into straps 37 connecting confronting ends of sections of a draw bar 38. The draw bar 38 has bearing plates 39 and 40 on which rests the ends of the frame 4, it being noted that these ends are described on arcs having a common center represented by the trunnions 36 of the member 35. The frame is therefore swiveled relative to the draw bar and the movement of said frame is limited relatively to the ends of the draw bar by depending stops 41 carried by one end of the frame 4 contiguous to the sides thereof.

One end of the draw bar 38 has a clevis or apertured member 42 so that a load may be attached thereto, and the bearing plate 40 at the opposite end of the draw bar co-operates with another plate 43 in providing a coupling for a trailer or load generally designated 44. The coupling may be effected by a coupling pin 45 or any other suitable means.

In describing the operation of the tractor, I will assume that the engine has been started and that the operator is on the trailer 44 controlling the rods 26 and 34. With the clutch member 27 in its normal position and the clutch members 17 in engagement with the clutch members 16, the tractor will move forward and should it be desired to back the tractor, the control rod 34 is pulled upon, thereby rocking the shaft 30 and shifting the double clutch member 27 into engagement with the other beveled gear wheel 20, thus causing the power plant 7 to impart a rearward movement to the traction wheels 2.

Assuming that the tractor is moving forward and that it is now desired to turn to the right, it is only necessary for the operator to pull upon the right controlling rod or rein 26 and in so doing one of the clutch members 17, the one on the right hand side of the tractor, is moved out of engagement with the right clutch member 16, thus causing the right beveled gear wheel 20 to idle relative to the drive shaft 18, so that said drive shaft may be driven by the left beveled gear wheel 20, thus driving the left traction wheel 2 while the right traction wheel serves as a pivot about which the tractor swings.

As the controlling mechanisms at the sides of the tractor are identical, it is obvious that when the operator allows the controlling mechanism at the right hand side of the tractor to assume normal position and pulls upon the left controlling rod 26, that the tractor will turn to the left.

I attach considerable importance to the fact that the transmission, differential and controlling mechanisms at one end of the frame 4 tend to balance the power plant at the opposite end of the frame, and in consequence of this arrangement the tractor is well balanced on the axle 1, particularly when coupled to a trailer or load, and by reason of such balancing, either end of the trailer frame can be readily moved for attachment to a load.

Considerable importance is also attached to the fact that the tractor is steered by power with such steering easily controlled from the trailer or load, and furthermore that the transmission, differential and controlling mechanism are assembled as compactly as possible relative to the main frame of the tractor.

It is thought that the operation and utility of my invention will be apparent without further description, and while in the drawings there is illustrated a preferred embodiment of my invention, it is to be understood that the structural elements are susceptible to such changes, in size, shape and manner of assemblage, as fall within the scope of the appended claims.

What I claim is:—

1. In a tractor, the combination of an axle, traction wheels revoluble upon said axle, a frame fixed on the axle, a power plant on the frame, power transmitting mechanism on the frame for transmitting motion from the power plant to said traction wheels, a draw-bar pivoted intermediate its ends to the axle to turn thereon and having engagement with the frame forwardly and rearwardly of said axle, and means for attaching a trailing device to the rear end of said draw-bar.

2. In a tractor, the combination of an axle, traction wheels revoluble upon said axle, a frame fixed on the axle, a power plant on the frame, power transmitting mechanism on the frame for transmitting motion from the power plant to said traction wheels, a draw-bar pivotally attached to the axle midway between said wheels and beneath said frame, and means for jointedly connecting a trailing device to the rear end of the draw-bar whereby a short turning radius is secured due to the pivotal connection of the forward end of the draw bar with the axle and the pivotal connection of the trailing device to its rear end.

3. In a tractor, an axle, traction wheels at the ends thereof, a frame secured upon said axle between said wheels, a draw bar pivotally connected to said axle intermediate its ends and movable below said frame in contact with the front and rear thereof, a power plant on one end of said frame, motion transmitting mechanism on the opposite end of said frame including a drive shaft and clutches adapted for imparting movement to said traction wheels, and means for attaching a trailing device to the rear end of said draw-bar.

4. In a two wheeled tractor having a single right axle and traction wheels rotatable upon the ends thereof, a frame rigidly secured to said axle, a power plant on said frame in a plane at one side of said axle, transmission mechanism on said frame in a plane at the other side of said axle, clutches associated with said transmission mechanism and normally establishing a driving relation between said power plant and said traction wheels, a draw-bar extending diametrically across the frame from front to rear in contact with the lower side thereof and embracing and pivotally attached to the axle to turn upon vertical pivots on the axle, and means for pivotally attaching a trailer device to the end of the draw-bar.

5. In a two-wheeled tractor having a single axle and traction wheels at the ends thereof, of a frame secured intermediate its ends on said axle, a power plant on one end of said frame, transmission mechanism on the opposite end of said frame and adapted to be operated thereby and impart movement to said traction wheels, a draw-bar divided intermediate its ends with said divided ends connected by straps extending above and beneath the axle, a member on the axle having studs passing through openings in the straps to pivotally connect the draw-bar to the axle, said draw-bar engaging the underside of said frame near its forward and rear portions to support the ends of said frame so that said frame may turn relative to said draw-bar upon the pivotal connection of the bar to the axle and is prevented from tilting relative thereto, clutches associated with said transmission mechanism, and normally establishing a driving relation between said power plant and said traction wheels, and controlling means for shifting said clutches.

In testimony whereof, I affix my signature in the presence of two witnesses.

LEO McCLOSKEY.

Witnesses:
  ANNA M. DORR,
  CHAS. W. STAUFFIGER.